No. 645,868. Patented Mar. 20, 1900.
J. J. MOSS.
PACKING.
(Application filed May 26, 1899.)
(No Model.)
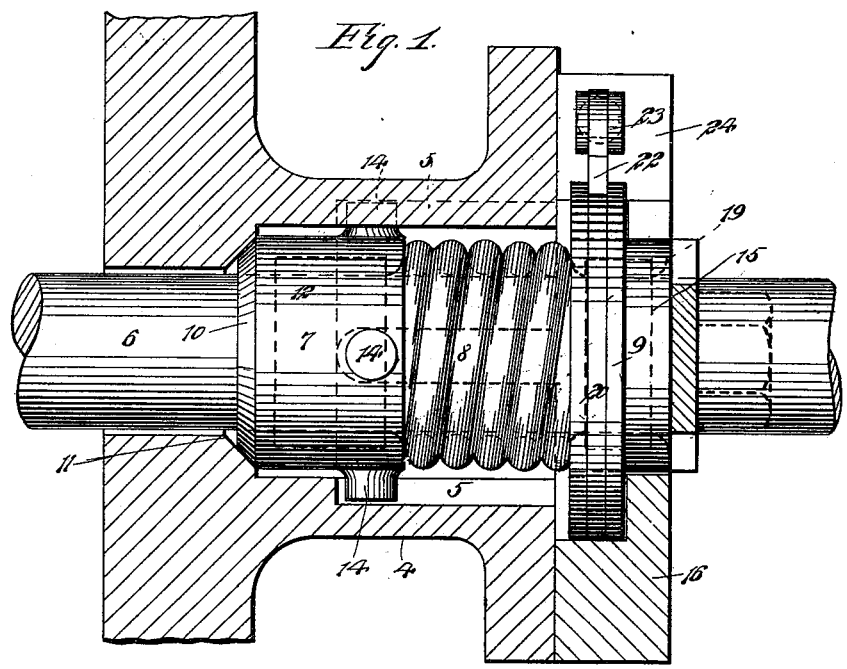
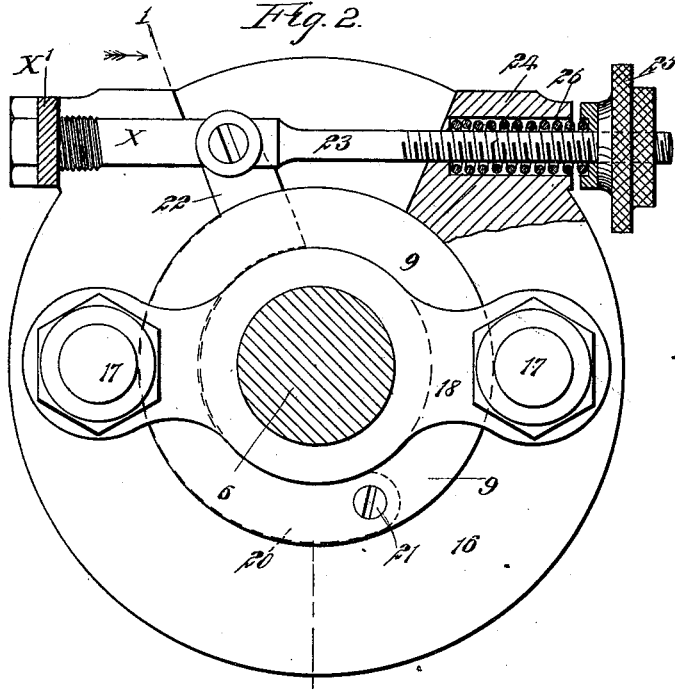
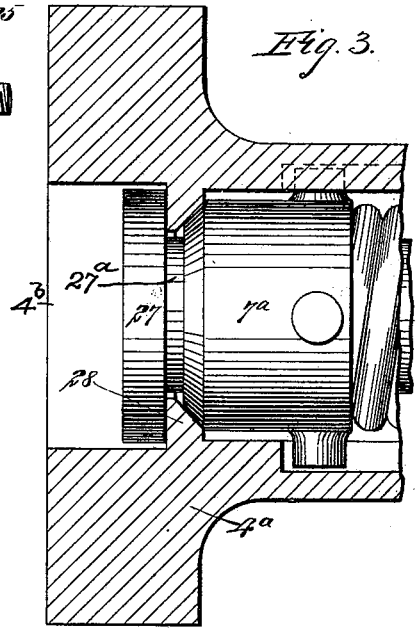
WITNESSES:
INVENTOR
John J. Moss
BY
ATTORNEYS
THE NORRIS PETERS CO., PHOTO-LITHO., WASHINGTON, D. C.

UNITED STATES PATENT OFFICE.

JOHN J. MOSS, OF CHICAGO, ILLINOIS.

PACKING.

SPECIFICATION forming part of Letters Patent No. 645,868, dated March 20, 1900.

Application filed May 26, 1899. Serial No. 718,384. (No model.)

*To all whom it may concern:*

Be it known that I, JOHN J. MOSS, of Chicago, in the county of Cook and State of Illinois, have invented a new and Improved Packing, of which the following is a full, clear, and exact description.

The purpose of this invention is to provide a packing which will be useful both for packing rods and joints or for use in connection with various forms of machinery, the invention relating to the same general class as that of my former patent, No. 258,794, dated May 30, 1882.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a sectional view of the invention, showing it applied on a rod-packing, the section being taken on the line 11 of Fig. 2. Fig. 2 is an end elevation thereof with parts broken away and with the rod shown in section, and Fig. 3 is a fragmentary sectional view illustrating the invention applied on a packing for coupled pipes.

Referring to Figs. 1 and 2, the stuffing-box 4, to which my invention is applied, is formed with four longitudinally-extending grooves 5 in the bore thereof, three of such grooves being shown by full and dotted lines in Fig. 1, and through said bore is passed the rod 6. The bore of the stuffing-box 4 is enlarged to receive the packing-sleeve, which comprises three principal parts—namely, the circular packing-collar 7, the spiral 8, and the head 9. The spiral 8 may, if desired, be provided with an interior packing of Babbitt or other analogous metal. These parts are formed integral, the packing-collar 7 having a beveled inner end 10 lying against the corresponding beveled portion 11 formed in the bore of the stuffing-box. The interior of the collar 7 is formed with a counterbore 12, in which Babbitt metal or other packing composition may be laid. The collar 7 is also provided with four studs 14, respectively sliding in the grooves 5 of the stuffing-box, so as to prevent the collar from turning and at the same time permit the collar to slide on the shaft. The spiral 8 is either formed integral with the collar 7 or has its inner end fastened securely thereto, the coils of the spiral being closely laid, so as to form practically a sleeve encircling the rod 6 within the stuffing-box. The head 9 is circular in form and, like the collar 7, is either integral with or rigidly secured to the adjacent end of the spiral 8. The head 9 has a counterbore 15, which, like the counterbore 12, should be filled with Babbitt metal or other packing composition. The head 9 is carried in a bearing 16, so that the head may turn freely in the bearing, and the bearing is held in place by means of bolts 17 passing through the bearing and into the gland, the bolts 17 also holding a cross-head 18, which has an opening receiving the rod and which bears against the head 9, pressing the head, with the other parts connected therewith, inward, and consequently assisting the bearing 16 in preventing the outward movement of the head 9 and the connected parts. The head 9 is formed with a semi-annular peripheral groove 19, in which is fitted a spanner 20, pivoted to the head at the point 21 and having a shank 22, pivotally connected with a rod 23, which extends tangentially through the head and slides through an extension 24 of the bearing 16. An adjusting-nut 25 is mounted on the end of the rod 23, and an expansive spring 26 encircles a part of the rod 23 and presses against the bearing 16 and against the nut 25, so as to throw the rod 23 rightward, (see Fig. 2,) and thus keeps the spanner 22 continually under pressure. The spanner tends to move the head 9, and this turning movement of the head 9 is transmitted to the spiral 8, serving to tighten the same around the shaft and effectively pack the same and also to push the collar 7 inward to further tighten the packing. It should be understood that the spiral 8 is yielding and that its ends are respectively in fast connection with the collar 7 and head 9, so that upon the turning of the head the spiral may be either contracted or expanded and the collar 7 pushed into active position or withdrawn therefrom.

Should the spiral 8 be disposed oppositely to the arrangement shown in the drawings, the arm 22 of the spanner may be provided with a rod X, threaded oppositely to the rod 23 and engaged in a nut X', fast on the bearing 16 opposite the extension 24, by which arrangement the spanner is drawn to the left. (See Fig. 2.) In this case the spanner also should be reversed.

The form of the invention shown in Fig. 3, such being the form adapted to packing coupled pipes, differs from the form shown in Figs. 1 and 2 only in the manner in which the pipe is fitted thereto. When the invention is used in this manner, the stuffing-box $4^a$ is provided with an internal flange 28. The pipe $27^a$ is passed through the packing in the same manner that the rod is arranged, as previously described, and the pipe is provided with a collar 27, screwed or otherwise fastened thereon, the collar fitting movably in a cavity $4^b$ in the stuffing-box. This allows the pipe $27^a$ and collar 27 a movement in the stuffing-box, but at the same time effectively packs the pipe to prevent leakage. The other section of the pipe is adapted to be flanged and bolted hermetically to the stuffing-box $4^a$, so as to communicate with the cavity $4^b$ therein.

Other means may be provided for moving the spanner, if desired. I do not limit myself to the arrangement shown.

Having thus described my invention, I claim as new and desire to secure by Letters Patent—

1. In a packing, the combination with a stuffing-box having a groove formed longitudinally in the bore thereof, of a packing-sleeve comprising a collar with a stud sliding in the groove, a spiral, one end of which is attached to the collar, and a head attached to the other end of the spiral, a bearing attached to the stuffing-box and carrying the head, and a spanner connected with the head and with the bearing, whereby to turn the head for contracting and expanding the packing-sleeve.

2. In a packing, the combination of a packing-sleeve, a bearing, a spanner connected with the sleeve, a rod connection with the spanner, and a spring-packing between the bearing and the rod and serving to keep the spanner under pressure.

3. In a packing, the combination with a stuffing-box having a longitudinally-extending groove in the bore thereof, of a packing-sleeve comprising three parts, namely, a collar with a stud sliding in the groove of the stuffing-box, a spiral, one end of which is fastened to the collar, and a head to which the other end of the spiral is fastened, a spanner connected with the head, a rod attached to the spanner, a bearing carried on the stuffing-box and serving to hold the head, and a spring connection between the rod and the bearing, to maintain the rod under pressure.

4. In a packing, the combination with a stuffing-box, of a packing-sleeve, comprising a spiral, the sleeve having connection at one end with the stuffing-box, a spanner connected with the other end of the sleeve, and means bearing between the spanner and stuffing-box and serving continually to maintain the spiral under pressure.

JOHN J. MOSS.

Witnesses:
WILLIAM BLISS,
A. BUTTS.